F. G. KAPELMAN.
BED.
APPLICATION FILED AUG. 14, 1913.
1,092,446.
Patented Apr. 7, 1914.
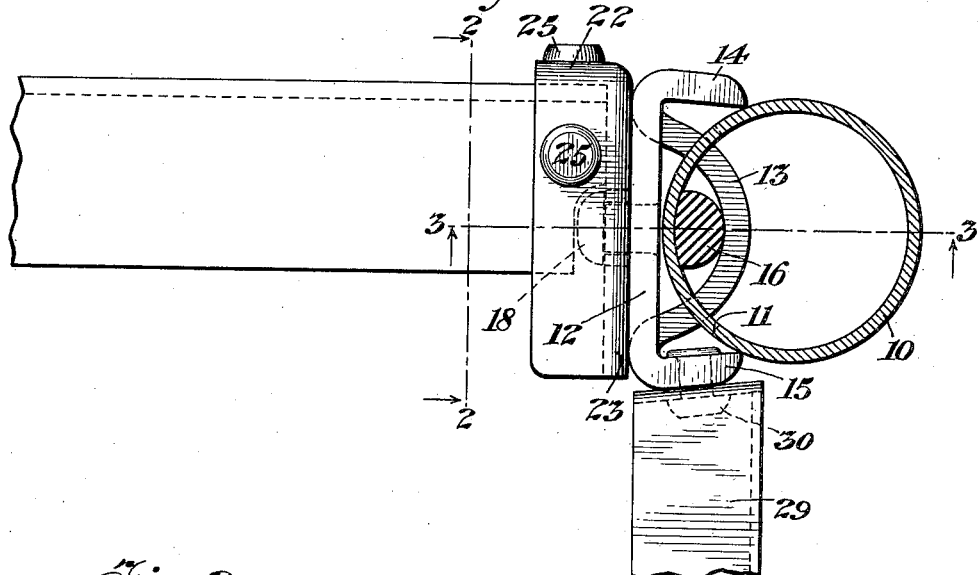
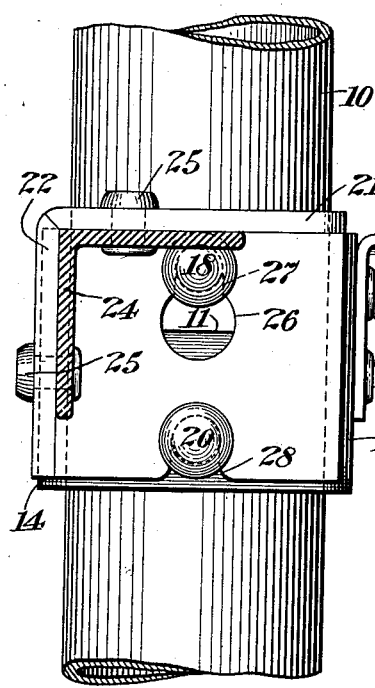
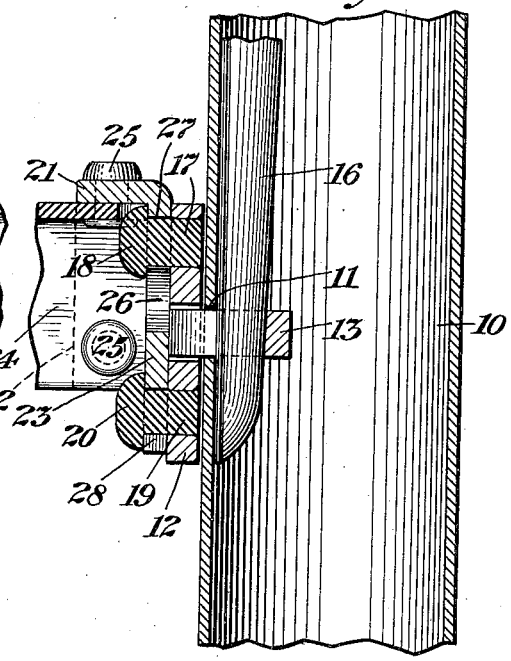
WITNESSES
Chas. F. Clagett
Marie D. Wohlers
INVENTOR
Felix G. Kapelman
BY
Arthur L. Serrell
HIS ATTORNEY

UNITED STATES PATENT OFFICE.

FELIX G. KAPELMAN, OF NEW YORK, N. Y.

BED.

1,092,446.

Specification of Letters Patent.

Patented Apr. 7, 1914.

Application filed August 14, 1913. Serial No. 784,667.

*To all whom it may concern:*

Be it known that I, FELIX G. KAPELMAN, a citizen of the United States, residing in the borough of Manhattan, city, county, and State of New York, have invented an Improvement in Beds, of which the following is a specification.

My present invention relates to metal beds, and particularly to the construction of the brackets by which the joints are made for connecting the head and foot members of the bedstead with the side rails thereof, the object of my invention being the provision of an inexpensive joint construction for connecting these parts, which is also one that permits the parts to be connected and disconnected readily, and when connected secures them together in a substantial manner, as will be hereinafter more particularly described.

In the drawing, Figure 1 is a sectional plan illustrating my invention. Fig. 2 is a sectional elevation taken on the line 2—2, Fig. 1, and Fig. 3 is a longitudinal section taken on the line 3—3, Fig. 1.

Referring to the drawing, the posts employed in a bed, to which my invention is applicable, are preferably hollow, as indicated at 10. Each post 10 is provided with a slot 11, of appreciable width, extending circumferentially of the post. I also employ a bracket plate, indicated at 12, made of suitable metal and provided with a member 13, preferably made integral therewith and extending from the rear surface of the plate. This member 13 is preferably curved, and is adapted to extend into and fit the slot 11 in the post, the distance the member 13 extends from the bracket plate 12 being such that when in position the edges of the post confining the ends of the slot contact with the outer surface of the member 13 and the inner surface of the bracket plate in a line approximately centrally thereof contacts with the outer surface of the post. The bracket plate 12 is also provided with side members 14 and 15, to such an extent that when the bracket is in position the edges of these side members also contact with the surface of the posts. This bracket plate is maintained in position, as hereinbefore described, by means of a pin 16, which is placed and preferably wedged between the inner surface of the post 10 and the adjacent surface of the curved member 13. I also employ a stud 17 having a head 18, and a stud 19 having a head 20, suitably secured in and extending from the outer surface of the bracket plate 12.

Together with the hereinbefore described parts, I employ a plate, preferably having three sides, indicated respectively at 21, 22 and 23. The side rail 24, preferably made of iron, is suitably secured to the sides 21 and 22, of this three-sided member, by means of rivets 25 or otherwise. In the side 23, of the three sided member or bracket, there is an aperture 26 and a recess 27, and immediately below the aperture 26 and the recess 27 is a recess 28. The aperture 26 is adapted to permit the head 18 of the stud 17 to pass through the same and the recess 27 is adapted to receive that portion of the stud 17 which extends from the surface of the bracket plate 12. Similarly, the recess 28 is adapted to receive that portion of the stud 19 which extends from the surface of the bracket plate 12. With the heads 18 and 20 of these studs contacting with the inner surface of the side 23 of the three sided bracket, the outer surface of the one in position lies flush against the outer surface of the bracket plate 12.

It will be apparent that in forming the curved member or loop 13 from the bracket plate 12 will cause a slot to be left in the outer surface of this plate, which in some instances may be objectionable, and in order to overcome this, a sheet of thin metal conforming to the shape of the bracket plate 12 may be placed over the outer surface thereof and secured thereto at the same time that the studs 17 and 19 are fixed in position therein. As will also appear from the drawing, the side member 15 of each bracket plate 12 may be provided with an aperture to receive a rivet 30, by means of which the cross or end rail 29 may be connected between two adjacent brackets.

I claim as my invention:

1. In a bedstead and in combination, a hollow post having a slot therein, a bracket, a member associated with the bracket and adapted to enter and fit the slot in the post, means for engaging the said member interiorly of the post, side members extending at an acute angle from the face of the bracket and adapted at their edges to engage the surface of the post when the bracket is secured thereto, and means associated with the bracket for connecting the same to the side rail of the bedstead.

2. In a bedstead and in combination, a hollow post having a slot therein, a bracket plate, a member made integral with the bracket plate and adapted to extend and fit within the slot in the post, side members secured to the said bracket plate and adapted to engage the outer surface of the post, a pin interiorly of the post for engaging the said member to secure the bracket in position, a side rail, an end member therefor having slots therein and head studs fixed in the said bracket and adapted to enter the slots in the end member of the side rail to secure the same in position relatively to the bracket.

3. In a bedstead and in combination, a hollow post having a slot therein, a bracket plate, a member associated with the bracket plate and adapted to enter and fit within the said slot, means engaging the said member interiorly of the post to assist in securing the bracket plate in position, side members associated with the bracket plate spaced apart a distance less than the diameter of the post so that the edges of the said side members grip the outer surface of the said post, a side rail, an end member connected thereto, and means associated with the said bracket plate and adapted to engage the end member of the rail to secure the parts together.

Signed by me this 12th day of August, 1913.

FELIX G. KAPELMAN.

Witnesses:
  Geo. T. Pinckney,
  J. B. Le Blanc.

---

Copies of this patent may be obtained for five cents each, by addressing the "Commissioner of Patents, Washington, D. C."